US011292409B2

(12) United States Patent
Töller et al.

(10) Patent No.: US 11,292,409 B2
(45) Date of Patent: Apr. 5, 2022

(54) BUMPER

(71) Applicant: Kirchhoff Automotive Deutschland GmbH, Attendorn (DE)

(72) Inventors: Marco Töller, Cologne (DE); Alexander Günther, Olpe (DE); Maria Schmitt, Attendorn (DE)

(73) Assignee: KIRCHHOFF AUTOMOTIVE DEUTSCHLAND GMBH, Attendorn (DE)

( * ) Notice: Subject to any disclaimer, the term of this patent is extended or adjusted under 35 U.S.C. 154(b) by 240 days.

(21) Appl. No.: 16/637,135

(22) PCT Filed: Aug. 13, 2018

(86) PCT No.: PCT/EP2018/071919
§ 371 (c)(1),
(2) Date: Feb. 6, 2020

(87) PCT Pub. No.: WO2019/034605
PCT Pub. Date: Feb. 21, 2019

(65) Prior Publication Data
US 2020/0254948 A1 Aug. 13, 2020

(30) Foreign Application Priority Data

Aug. 14, 2017 (DE) .......................... 102017118511.9

(51) Int. Cl.
B60R 19/48 (2006.01)
B60R 21/0136 (2006.01)
(52) U.S. Cl.
CPC ........ B60R 19/483 (2013.01); B60R 21/0136 (2013.01)

(58) Field of Classification Search
CPC ....... B60R 19/04; B60R 19/18; B60R 19/483; B60R 21/0134; B60R 11/00;
(Continued)

(56) References Cited

U.S. PATENT DOCUMENTS 8,950,794 B2 2/2015 Lenkenhoff
9,446,799 B2 9/2016 Franzpötter
(Continued)

FOREIGN PATENT DOCUMENTS

DE 102007045001 A1 4/2009
DE 102010007206 A1 12/2010
(Continued)

OTHER PUBLICATIONS

U.S. Appl. No. 16/633,769, filed Jan. 24, 2020 (Günther), applicant Kirchhoff Automotive Deutschland GmbH. Per USPTO waiver of Rule 1.98(a)(2)(iii) requirement, copy not provided since available in the USPTO IFW system.
(Continued)

Primary Examiner — Gregory A Blankenship
(74) Attorney, Agent, or Firm — Polson Intellectual Property Law, PC; Margaret Polson; Christopher Sylvain

(57) ABSTRACT

A bumper, which comprises a bumper crossmember having an outer shell and having at least one sensor holder arranged therein, and an outer cladding shell. The at least one sensor holder is implemented as an impressed pocket originating from the front-side termination of the outer shell and having an upper wall, a lower wall and a base connecting the two walls. On the side of the outer cladding shell pointing toward the bumper crossmember, in the region of a sensor holder, the outer cladding shell carries at least one sensor engaging in the sensor holder.

16 Claims, 2 Drawing Sheets

(58) Field of Classification Search
CPC ......... B60R 11/004; B60R 2019/01886; B60R 21/0136; G01S 2013/9314; G01S 2013/93271; G01S 2013/93275
USPC .......................................................... 293/102
See application file for complete search history.

(56) References Cited

U.S. PATENT DOCUMENTS

| | | | |
|---|---|---|---|
| 9,598,100 | B2 | 3/2017 | Lenkenhoff |
| 9,764,764 | B2 | 9/2017 | Irle |
| 10,005,495 | B2 | 6/2018 | Töller |
| 10,577,025 | B2 | 3/2020 | Michler |
| 2007/0194892 | A1* | 8/2007 | Schaaf ................. B60R 19/483 340/435 |
| 2015/0102614 | A1* | 4/2015 | Arns ..................... B60R 19/023 293/102 |
| 2017/0232917 | A1* | 8/2017 | Nakayama ............. B60R 19/18 293/102 |
| 2018/0215324 | A1* | 8/2018 | Kataoka ................ G01S 17/931 |
| 2019/0168691 | A1* | 6/2019 | Herrmann ............ H05K 5/0073 |
| 2019/0185060 | A1 | 6/2019 | Gündogan |
| 2019/0344385 | A1 | 11/2019 | Töller |
| 2020/0262376 | A1* | 8/2020 | Aizawa ................. B60R 19/483 |
| 2020/0406845 | A1* | 12/2020 | Sonoda ................ B60Q 1/0023 |
| 2021/0215517 | A1* | 7/2021 | Bensalem ............. G09G 3/344 |

FOREIGN PATENT DOCUMENTS

| | | |
|---|---|---|
| DE | 102013006365 A1 | 3/2014 |
| DE | 102014009941 A1 | 1/2016 |
| KR | 101252221 B1 | 4/2016 |
| KR | 101651566 B1 | 8/2016 |

OTHER PUBLICATIONS

U.S. Appl. No. 16/636,623, filed Feb. 24, 2020 (Günther), applicant Kirchhoff Automotive Deutschland GmbH. Per USPTO waiver of Rule 1.98(a)(2)(iii) requirement, copy not provided since available in the USPTO IFW system.

International Search Report dated Oct. 24, 2018 in parent international application No. PCT/EP2018/071919.

Written Opinion of the International Searching Authority dated Oct. 24, 2018 in parent international application No. PCT/EP2018/071919.

* cited by examiner

BUMPER

BACKGROUND

The present disclosure relates to a bumper which comprises a bumper crossmember having an outer shell and having at least one sensor holder arranged therein, and an outer cladding shell.

Motor vehicles have front and rear bumpers. These serve to absorb impacts up to a certain strength without the rest of the vehicle body taking damage. Modern bumpers comprise a bumper crossmember which is supported on the body side, typically on the side members, by energy-absorbing crash elements, so-called crash boxes. The bumper crossmember is faced, for front and rear termination of the vehicle, with an outer skin, typically a cladding shell made from a plastic material. The bumper crossmember serves to distribute the impact energy across the width of the vehicle and thus to discharge the impact energy into crash elements which are spaced from one another.

Sensors are generally housed in a cladding shell of a bumper. In particular, close-range distance measurement sensors for use in conjunction with a parking assistance system are a typical component of such cladding shells. Such close-range distance measurement sensors are also referred to as parking sensors. These parking sensors are held on the outer cladding shell, and their sensor head engages with a corresponding recess in the outer cladding shell. There is typically a certain distance between the facing shell and the bumper crossmember. In order not to have to enlarge the gap between the outer cladding shell and the bumper crossmember in the event of mounting of sensors, for example parking sensors, on the bumper, through-holes are introduced into the bumper crossmember as sensor holders. The sensors carried by the cladding shell dip into said holes. Such a through-hole is required in order to provide sufficient space in order to be able to introduce an electrical connection cable onto the connector on the rear termination of the sensor located opposite the sensor head.

In order to achieve the necessary rigidity while at the same time achieving cost-effective manufacturing of such a bumper crossmember, this is typically constructed with a double-shell structure, i.e. with an outer shell and an inner shell which are arranged one in front of the other in the direction of travel of the vehicle. In this manner, the bumper crossmember forms a hollow-chamber profile which runs transverse to the direction of travel. The through-holes for the provision of a sensor holder are introduced into the outer shell. Through the introduction of through-holes to provide the necessary sensor holders, the outer shell and thus the bumper crossmember as a whole is weakened at the sites of the through-holes, which can result in unwanted buckling of the bumper crossmember under an impact which should be absorbed. This is compensated for through the use of an outer shell with adequately greater material thickness. However, this increases the weight of the bumper crossmember. The problem outlined above occurs in particular when such a bumper is to carry more than just one or two sensors and/or has a single-shell, particularly hat-shaped, design and is arranged open in the vehicle direction.

In addition to the bumpers described above, bumpers in which the sensors are arranged and held on the bumper crossmember are also known. The problem with such a design is that the sensor heads of the sensors are at a distance from the outer cladding shell and are covered by it. The sensor data is proportionally less accurate, for example if the sensors are ultrasound sensors within the context of a parking assistance system. These types of bumper designs are known from DE 10 2014 009 941 A1 or DE 10 2013 006 365 A1, for example.

SUMMARY

Proceeding from this background, an aspect of the present disclosure is therefore to develop a bumper of the type specified at the beginning such that, regardless of the number of sensors that the thus-equipped bumper is to carry, an increase in weight which accompanies an increase in the number of sensors is avoided.

According to the present disclosure, this is solved through a bumper comprising a bumper crossmember having an outer shell and at least one sensor holder arranged therein, and an outer cladding shell, in which the at least one sensor holder is implemented as an impressed pocket originating from the front-side termination of the outer shell and having an upper wall, a lower wall and a base connecting the two walls, and the outer cladding shell carries at least one sensor engaging in the sensor holder on the side of the outer cladding shell pointing towards the bumper crossmember in the region of a sensor holder.

In contrast to the prior art discussed above, the sensor holders in the bumper crossmember are designed in this bumper not as through-holes, but rather as impressed pockets towards the vehicle and thus in the x direction of the axial direction of the vehicle. These pockets have an upper wall, a lower wall and a base connecting the two walls. The two walls are spaced from one another in the z direction. In contrast to bumper crossmembers in the state of the art, such a recess in the outer shell of the bumper crossmember does not weaken it and thus the entire bumper crossmember, but rather the opposite is true: this measure stiffens the outer shell. A bumper which comprises such a bumper crossmember can therefore also have multiple sensor holders without the outer shell of the bumper crossmember needing to be designed with greater material thickness in order to ensure the desired stiffness. Owing to the structures introduced into the bumper crossmember by the impressed sensor holders, its stiffness is increased not only against buckling, but also against torsion strains. For this reason, the bumper crossmember according to this concept can therefore even sometimes be designed with a reduced material thickness with regard to its outer shell. The impressions act as a form of stiffening beading. Owing to the stiffening effect of the pocket-like sensor holders, it is sometimes even possible to forego the use of a second shell to achieve the same stiffness of the bumper crossmember owing to the at least one stiffening embossment relating thereto.

It is nevertheless also possible to design the bumper crossmember of such a bumper as a double-shelled structure with an outer shell and an inner shell.

The two shells are connected to one another to form a hollow-chamber profile, through welding of connection flanges which lie next to each other for example.

The sensor holders in the bumper crossmember are preferably designed such that they also comprise a right-hand and left-hand side wall in addition to the upper wall, the lower wall and the base connecting the two walls. These side walls, as well as the upper and lower walls, may be angled toward each other, wherein the cross-sectional area tapers towards the base of the sensor holder.

The at least one sensor holder may be arranged in a bead which is integrated into the longitudinal extension of the outer shell in the direction of the inner shell. If this bead is sufficiently deep for the sensor holder, then the sensor holder provided by the bead does not necessarily need to have a right-hand and left-hand side wall. If the depth of such a bead is insufficient to serve as a sensor holder, then the depth of the same is increased in the region of the sensor holder formed as an impressed pocket such that, as with an arrangement of the sensor holder outside such a bead, the sensor holder also has a right-hand and a left-hand wall. These walls are angled towards the base of the sensor holder. If an outer shell of the bumper crossmember with bead which follows the longitudinal extension of the latter, impressed towards the rear shell, is envisaged, then further stiffening of the same may be effected through making the height reached by the bead in the direction of the vertical extension of the bumper crossmember greater in the region of a sensor holder than the bead sections next to the sensor holder. Such an embossment in the height of the bead works to increase the stiffness.

In order to keep the distance from the outer cladding shell of the bumper crossmember to a bumper on which it is equipped low, the cladding shell preferably carries sensors which are equipped with a connector arranged in a radial direction or an electrical connection cable leading out of the sensor in this direction. The design of a bumper with such sensors is also advisable taking into consideration that not only can the length of the electrical connection cable be reduced since a cable loop is not required, but also that damage to the connection cable in the region of a cable loop on the edges of the through-holes, as can sometimes occur in bumpers according to the prior art, is prevented.

It is preferable, in the bumper according to the present disclosure, for the at least one sensor to be carried by the outer cladding shell. This is advantageous because the bumper with its bumper crossmember and the design of the at least one sensor holder can then be dimensioned such that the sensor engages or dips into a sensor holder without contacting it. The sensor does not necessarily need to be mechanically supported on the bumper crossmember, although this is possible. Without a mechanical support, vibration decoupling is effected. Impacts which act on the outer cladding shell can then also be absorbed without damaging the sensor, at least with regard to the possible crumple space of the cladding shell against the outer shell of the bumper crossmember to the extent that the sensor is distanced from the base or the walls of the sensor holder. The same applies for impacts which act non-horizontally on the outer cladding shell to which the cladding shell reacts flexibly. As a result of the distancing of the outer shell surface of the sensor from the upper wall and the lower wall and, where applicable, the side walls as envisaged in an embodiment with side walls, the sensor can also follow the cladding shell in movements relating to this without damage. The distancing of the termination of the sensor opposite the sensor head from the base of the sensor holder is typically a few millimeters to approx. 15 millimeters. This distance may also be greater depending on the available installation space. If the bumper is to have the shortest possible length in the x direction of the vehicle, the sensor holder is designed adapted to the sensor such that the sensor engages 60%-80% with its extension pointing in the longitudinal direction of the vehicle in the sensor holder in the longitudinal direction of the vehicle (x direction).

The directions used herein—x direction, y direction and z direction—are the usual directions used in a vehicle, wherein the x direction is the direction of the vehicle in its longitudinal extension, the y direction is the transverse direction to the longitudinal direction and the z direction is the height of the vehicle.

BRIEF DESCRIPTION OF THE DRAWINGS

The present disclosure is further described below by way of an example embodiment with reference to the attached figures. In the figures.

DETAILED DESCRIPTION

Figure 1:
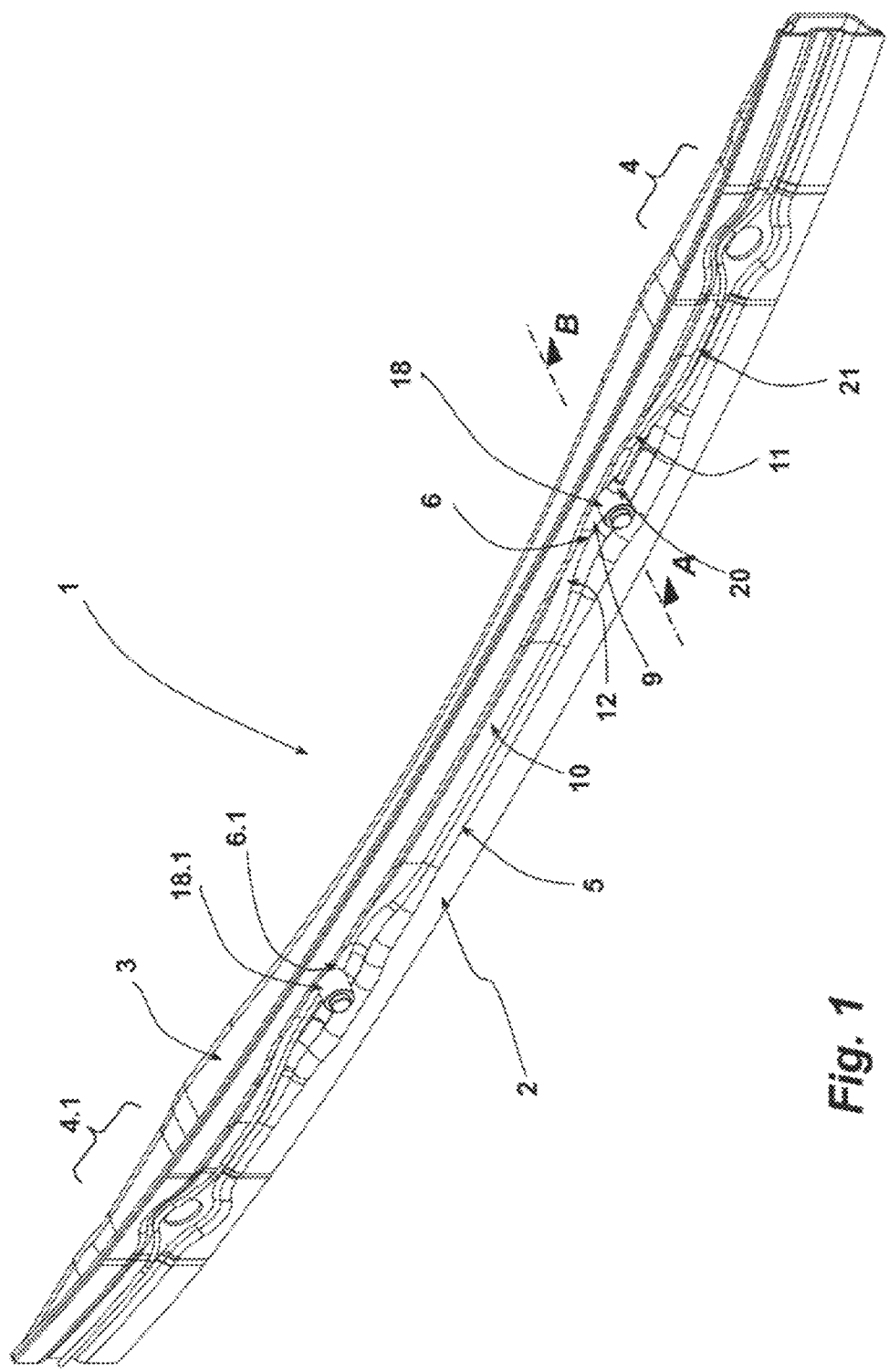
FIG. 1 shows a perspective view of a bumper crossmember as part of a bumper for a motor vehicle.

With reference to FIG. 1, a bumper crossmember 1 is made up of two shells 2, 3 each formed from a sheet metal plate. The shell 2 is the outer shell and is thus pointed away from the body of a vehicle, while the shell 3 is the inner shell pointing towards the vehicle. The bumper crossmember 1 is connected to the side members of a vehicle through crash elements. To this end, the bumper crossmember 1 or its inner shell 3 has connecting sections 4, 4.1, each of which is connected to a crash element in order to connect the bumper crossmember 1 to a vehicle body. The openings introduced into the connecting sections 4, 4.1 serve to attach a tow hook if required.

The first, outer shell 2 of the bumper crossmember 1 is designed with a stiffening bead 5 which follows the longitudinal extension of the bumper crossmember 1. The stiffening bead 5 is incorporated into the outer shell 2 in the direction of the second, inner shell 3. The bumper crossmember 1 is part of a bumper, the outer cladding shell (not shown in FIG. 1) of which carries two sensors 18, 18.1, for example parking sensors. To this end, two sensor holders 6, 6.1 are impressed into the outer shell 2 as pockets. The sensor holders 6, 6.1 are located within the longitudinal extension of the stiffening bead 5. The pocket-like sensor holders 6, 6.1 are created by an embossment height and embossment depth which go beyond the impression which forms the stiffening bead 5. The sensor holders 6, 6.1 are thus designed as beading which additionally stiffens the stiffening bead 5 in the embodiment shown. As can be seen better in the sectional view in FIG. 2, each sensor holder 6, 6.1 is provided by an upper wall 7, a lower wall 8 and a base 9 connecting these two walls 7, 8. The base 9 forms the continuation of the base 10 of the stiffening bead 5. A right-hand wall section 11 and a left-hand wall section 12, only indicated for the sensor holder 6 in FIG. 1, connect the base 10 of the stiffening bead 5 to the base 9 of the sensor holder 6, 6.1. The right-hand and left-hand wall sections 11, 12 have a length in the embodiment shown which roughly corresponds to the length of the base 9 of each sensor holder 6, 6.1.

In a design which is not shown in the figures, the sensor holders have different sizes. A through-hole which extends the height and depth of such a stiffening bead which at least partially follows the longitudinal extension of the bumper crossmember may also be introduced into the stiffening bead, for the mounting of a towing device, for example. Such a change in the height and, where applicable, the depth of the stiffening bead contributes to the reinforcement of the bumper crossmember. In the concept of a bumper crossmember design as described, the bead which follows the longitudinal extension of the bumper crossmember is used in order to provide the bumper crossmember with additional features through appropriate embossments of the bead.

Figure 2:
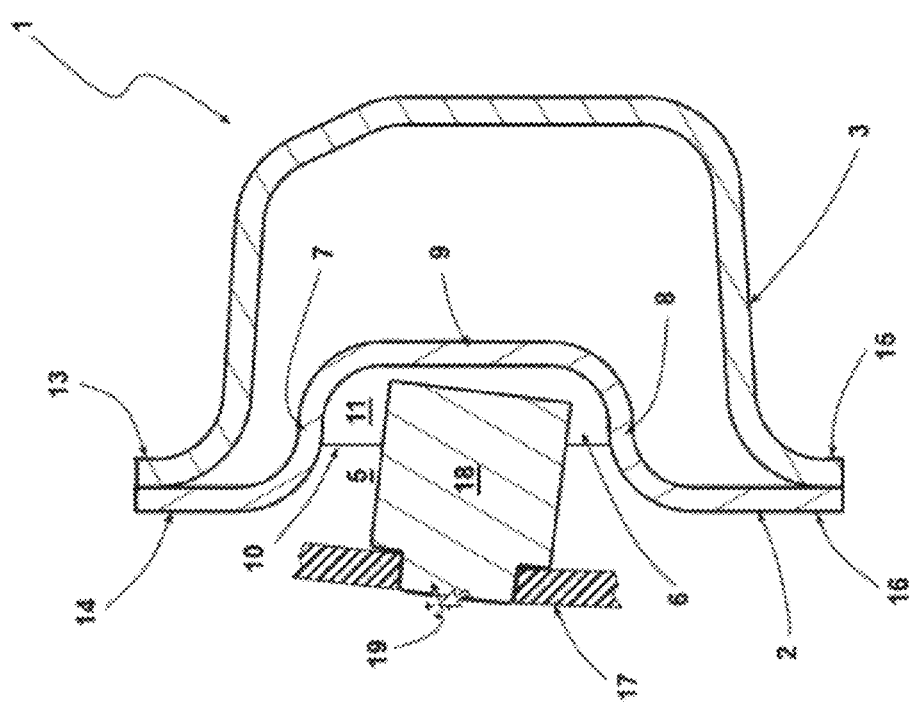
FIG. 2 shows a schematic cross section through the bumper crossmember along the line A-B of FIG. 1.

The cross-sectional view of FIG. 2 shows that the two shells 2, 3 are each designed in the form of a hat profile and each have an upper connection flange 13, 14 and a lower connection flange 15, 16. These lie flat against one another in a section. In order to connect the two shells 2, 3, these are joined to one another around the edge by their upper connection flanges 13, 14 and their connection flanges 15, 16 with a welded joint.

The sensor holders 6, 6.1 provide enough space that a sensor 18 carried by an outer cladding shell 17 (see FIG. 2) can dip into each of them. The sensor 18 itself is not supported in the sensor holder 6, 6.1 in the embodiment shown; there is thus a gap from the base 9 and the upper wall 7 and the lower wall 8 to the sensor 18. The sensors 18, 18.1 are carried by the outer cladding shell 17 as is schematically shown in the sectional view in FIG. 2. To this end, the sensor head 19 of the sensor 18 engages with a corresponding opening in the cladding shell 17. Its front side is thus not covered by the cladding shell 17. The mounting of the sensor 18 on the outer cladding shell 17 is only schematically shown in FIG. 2. This may be glued to the cladding shell 17 in the through-hole introduced into the outer cladding shell 17 through which the sensor head 19 protrudes. The sensors 18, 18.1 have a connector port arranged in a radial direction on the housing thereof such that these can be contacted from this direction by a connector 20 on the connection end of a connection cable 21. The connection cable 21 located on the connector 20 is routed in the stiffening bead 5 to the side termination of the bumper crossmember 1 in order to then be conducted to an appropriate control device.

The bumper crossmember described may be mounted on the vehicle both as a front and a rear bumper.

The invention has been described with reference to the figures by way of an example embodiment. A person skilled in the art may implement numerous other possibilities of the invention without departing from the scope of the applicable claims, without this needing to be outlined within the context of these embodiments.

LIST OF REFERENCE NUMBERS

1 Bumper crossmember
2 Shell
3 Shell
4, 4.1 Connecting section
5 Stiffening bead
6, 6.1 Sensor holder
7 Upper wall
8 Lower wall
9 Base
10 Base
11 Right-hand wall section
12 Left-hand wall section
13 Upper connection flange
14 Upper connection flange
15 Lower connection flange
16 Lower connection flange
17 Cladding shell
18, 18.1 Sensor
19 Sensor head
20 Connector
21 Connection cable

The invention claimed is:

1. A bumper comprising:
a bumper crossmember and an outer cladding shell, the bumper crossmember having an outer shell and at least one sensor holder arranged therein;
wherein the at least one sensor holder is implemented as an impressed pocket originating from a front-side termination of the outer shell, the at least one sensor holder having an upper wall, a lower wall, a base connecting the upper and lower walls, a right-hand side wall and a left-hand side wall; and
the outer cladding shell carries at least one sensor engaging in the at least one sensor holder on a side of the outer cladding shell facing the bumper crossmember.

2. The bumper of claim 1, wherein the sensor engages in the sensor holder without contacting the sensor holder.

3. The bumper of claim 2, wherein the depth of the sensor holder is designed such that the sensor accommodated therein engages in the sensor holder with at least 40% of the sensor's extension in a longitudinal direction of a vehicle.

4. The bumper of claim 3, wherein the sensor accommodated in the sensor holder engages in the sensor holder with 60%-80% of the sensor's extension in the longitudinal direction of the vehicle.

5. The bumper of claim 1, wherein the depth of the sensor holder is designed such that the sensor accommodated therein engages in the sensor holder with at least 40% of the sensor's extension in a longitudinal direction of a vehicle.

6. The bumper of claim 5, wherein the sensor accommodated in the sensor holder engages in the sensor holder with 60%-80% of the sensor's extension in the longitudinal direction of the vehicle.

7. The bumper of claim 1, wherein the outer shell of the bumper crossmember is a first shell, and the bumper crossmember has a second shell provided as an inner shell, wherein the outer shell and the inner shell are connected to one another to form a hollow chamber profile.

8. The bumper of claim 7, wherein the outer and inner shells each have an upper and a lower connection flange which are placed in a flat arrangement to join the outer and inner shells together at said upper and lower connection flanges.

9. The bumper of claim 1, wherein the at least one sensor holder is integrated into a bead formed along the longitudinal extension of the outer shell, which bead extends in the direction of a vehicle or a second inner shell of the bumper crossmember.

10. The bumper of claim 9, wherein the at least one sensor holder has a greater height than the bead.

11. The bumper of claim 10, wherein the at least one sensor holder has a greater depth than the bead.

12. The bumper of claim 9, wherein the at least one sensor holder has a greater depth than the bead.

13. The bumper of claim 1, wherein the bumper crossmember has multiple sensor holders designed as pockets arranged spaced apart from each other.

14. The bumper of claim 1, wherein the at least one sensor carried by the outer cladding shell includes a close-range distance measurement sensor.

15. The bumper of claim 1, wherein the at least one sensor has a connector port arranged in a radial direction in relation to a housing of the sensor for connection of a connection cable.

16. The bumper of claim 1, wherein the side walls and the upper and lower walls are angled towards each other, wherein the cross-sectional area of the sensor holder tapers towards the base of the sensor holder.

* * * * *